(12) United States Patent  (10) Patent No.: US 7,884,877 B2
Toguchi  (45) Date of Patent: Feb. 8, 2011

(54) IMAGING DEVICE AND AUTOFOCUSING METHOD

(75) Inventor: Masaaki Toguchi, Toyota (JP)

(73) Assignee: Elmo Company, Limited (JP)

( * ) Notice: Subject to any disclaimer, the term of this patent is extended or adjusted under 35 U.S.C. 154(b) by 412 days.

(21) Appl. No.: 11/946,187

(22) Filed: Nov. 28, 2007

(65) Prior Publication Data
US 2008/0165274 A1    Jul. 10, 2008

(30) Foreign Application Priority Data
Jan. 9, 2007   (JP) .................................. 2007-1109

(51) Int. Cl.
G03B 13/00    (2006.01)
(52) U.S. Cl. ...................................... 348/345; 348/356
(58) Field of Classification Search .............. 348/220.1, 348/345, 349, 356
See application file for complete search history.

(56) References Cited

U.S. PATENT DOCUMENTS

2002/0171750 A1\* 11/2002 Kato ........................... 348/345
2004/0263674 A1\* 12/2004 Koreki ........................ 348/345
2006/0133791 A1\* 6/2006 Miyata ........................ 396/103

FOREIGN PATENT DOCUMENTS

JP            6-133205         5/1994

\* cited by examiner

*Primary Examiner*—Lin Ye
*Assistant Examiner*—Euel K Cowan
(74) *Attorney, Agent, or Firm*—Ostrolenk Faber LLP

(57) ABSTRACT

In an imaging device according to one aspect of the invention, an amplitude demand Ac is specified according to a wobbling amplitude Ai required for detection of a hill-climbing direction based on an F value and a wobbling amplitude Ag required for detection of the hill-climbing direction based on an AGC gain. An allowable amplitude Am set for preventing a potential image shake caused by a magnification change with a position shift of a compensator lens in wobbling is specified corresponding to a zoom position and an object distance. When Ac>Am, the control procedure restricts the wobbling amplitude to Am and increases a sampling number of AF evaluation values to be detected at respective positions in wobbling, in order to ensure the sufficient detection performance of the hill-climbing direction. When Ac□Am on the other hand, the control procedure sets Ac to the wobbling amplitude. This arrangement of the imaging device efficiently ensures the sufficient detection performance of the hill-climbing direction for autofocusing control, while effectively preventing deterioration of the quality of a captured image due to the magnification change in the wobbling motion.

15 Claims, 7 Drawing Sheets

Fig.5

| F VALUE (F) | WOBBLING AMPLITUDE (Ai) |
|---|---|
| F < 2 | 2 |
| 2 ≦ F < 2.8 | 2 |
| 2.8 ≦ F < 4 | 3 |
| 4 ≦ F < 5.6 | 3 |
| 5.6 ≦ F < 8 | 4 |
| 8 ≦ F < 11 | 4 |
| 11 ≦ F < 16 | 5 |
| 16 ≦ F < 22 | 5 |
| 22 ≦ F < 32 | 6 |
| 32 ≦ F | 6 |

Fig.6

| AGC GAIN (G) | WOBBLING AMPLITUDE (Ag) |
|---|---|
| G < 6dB | 2 |
| 6dB ≦ G < 12dB | 3 |
| 12dB ≦ G < 18dB | 4 |
| 18dB ≦ G < 24dB | 5 |
| 24dB ≦ G | 6 |

Fig.7A

| MAGNIFICATION CHANGE RATE (ZR) | | ZOOM POSITION (ZP) | | | | |
|---|---|---|---|---|---|---|
| | | ×1 (wide END) | ×2.38 | ×5.6 | ×13.19 | ×31.14 (tele END) |
| OBJECT DISTANCE (OD) | ∞ | −0.039% | −0.010% | 0.016% | 0.015% | −0.090% |
| | 5m | −0.039% | −0.009% | 0.017% | 0.019% | −0.063% |
| | 1m | −0.039% | −0.009% | 0.020% | 0.036% | −0.006% |

Fig.7B

| ALLOWABLE AMPLITUDE (Am) | | ZOOM POSITION (ZP) | | | | |
|---|---|---|---|---|---|---|
| | | ×1 (wide END) | ×2.38 | ×5.6 | ×13.19 | ×31.14 (tele END) |
| OBJECT DISTANCE (OD) | ∞ | 4 | 6 | 6 | 6 | 2 |
| | 5m | 4 | 6 | 6 | 6 | 3 |
| | 1m | 4 | 6 | 6 | 4 | 6 |

Fig.8

| Ac/Am RATIO (AR) | SAMPLING NUMBER (SR) |
|---|---|
| $1 < AR \leq 2$ | 2 |
| $2 < AR \leq 3$ | 3 |
| $3 < AR$ | 4 |

IMAGING DEVICE AND AUTOFOCUSING METHOD

CLAIM OF PRIORITY

The present application claims the priority from Japanese application P2007-1109A filed on Jan. 9, 2007, the contents of which are hereby incorporated by reference into this application.

BACKGROUND

1. Field of the Invention

The present invention relates to an autofocusing technique for an imaging device that converts an optical image, which is captured via an optical system having a focus adjustable function, into a video signal by means of an imaging system.

2. Description of the Related Art

The advance of the digital techniques has boosted the spread of digital video cameras and other imaging devices. The imaging device generally has an autofocusing mechanism that automatically adjusts the position of a focus lens to be focused on a subject. One typical technique adopted for the autofocusing mechanism is hill-climbing control. The hill-climbing control adopts the wobbling technique to identify the focusing direction of a focus lens on a subject and moves the focus lens in the identified focusing direction to obtain an AF evaluation value. The AF evaluation value represents a high frequency component of a luminance signal that is generated by a CCD or another imaging element and is detected by a wave detector. The position of the focus lens giving a peak of the AF evaluation value is specified as a focus position, and the focus lens is controlled to be set in this specified focus position. The wobbling technique minutely oscillates the focus lens at a fixed wobbling amplitude along an optical axis to detect a variation in AF evaluation value and identifies the increasing direction of the AF evaluation value (that is, the hill-climbing direction) as the focusing direction of the focus lens.

The closer aperture of the imaging device leads to the greater depth of the field, so that the wobbling motion at the fixed wobbling amplitude decreases the variation in AF evaluation value. This makes it difficult to accurately detect the hill-climbing direction. In such cases, the hill-climbing control increases the wobbling amplitude with closure of the aperture. The higher AGC gain of the imaging device leads to the lower S/N ratio, so that the wobbling motion at the fixed wobbling amplitude increases the variation in AF evaluation value. This lowers the reliability of the AF evaluation value and thus makes it difficult to accurately detect the hill-climbing direction. In such cases, the hill-climbing control increases the wobbling amplitude with an increase of the AGC gain. The unlimited increase of the wobbling amplitude, however, adversely affects the quality of captured images. When there is a requirement for increasing the wobbling amplitude to or over a specific level, one applicable control technique increases the sampling number of AF evaluation values, instead of the wobbling amplitude, to enhance the detection performance of the hill-climbing direction. A known imaging device with such a control mechanism is disclosed, for example, in JP-A-06-133205.

In inner focus cameras, a compensator lens generally has a function of a correction lens in zoom control for compensating a variation of an imaging surface of a variator lens having a magnification change function, while having a function of a focus lens in focusing control for changing an imaging distance. The optical design of the inner focus camera is ideally determined to eliminate a magnification change due to a position shift of the focus lens. The actual optical design of the inner focus camera is determined to control the magnification change in a practically allowable level according to various restricting conditions including the manufacturing cost and the camera size.

The inner focus camera accordingly has a slight magnification change with a position shift of the focus lens in the wobbling motion. Even the slight magnification change may cause a shake of a captured image and have an adverse effect on the resulting image quality. This phenomenon is especially prominent in the wobbling motion of the focus lens in a position range close to its focus position. There would thus be a demand for an imaging device that ensures the sufficient detection performance of the hill-climbing direction for autofocusing control, while preventing deterioration of the quality of a captured image due to a magnification change in the wobbling motion.

SUMMARY

One aspect of the invention pertains to an imaging device that converts an optical image, which is captured via an optical system having a focusing function, into a video signal by means of an imaging system. The imaging device includes: a high frequency component extractor that adjusts the video signal with a preset gain controlled according to an imaging condition and detects intensity of a specific signal in a certain frequency band, which includes at least a high frequency component and is generated in a focus state of the optical image captured via the optical system, from the adjusted video signal; a setting module that sets a variation range of changing a state of the optical system, based on at least information on a magnification change of the optical image caused by a change of the state of the optical system, where the variation range is used for detection of a state changing direction of the optical system or a focusing direction for focusing the optical image; a signal intensity variation detector that detects a variation in intensity of the specific signal in the set variation range a specified number of times while changing the state of the optical system in the set variation range; a focusing direction detector that detects the focusing direction, based on the detected variation in intensity of the specific signal; and an optical system controller that detects the intensity of the specific signal while changing the state of the optical system in the detected focusing direction, specifies a certain state of the optical system giving a peak intensity of the specific signal as the focus state of the optical system, and controls the optical system to the specified focus state.

The imaging device according to this aspect of the invention sets the variation range of changing the state of the optical system for detection of the focusing direction, based on at least the information on the magnification change of the optical image due to the change of the state of the optical system. The imaging device detects the variation in intensity of the specific signal, while changing the state of the optical system in the set variation range. The imaging device then detects the focusing direction according to the detected variation in intensity of the specific signal and controls the optical system in the detected focusing direction to adjust the focus state of the optical system. This arrangement effectively controls the potential effect of the magnification change of the optical image caused by the change of the state of the optical system on the resulting image quality in detection of the focusing direction of the optical system.

The technique of the invention is not restricted to the imaging device having the configuration discussed above but may be actualized by other applications, for example, an autofocusing method.

BRIEF DESCRIPTION OF THE DRAWINGS

FIG. 5 shows one example of an F value/amplitude table;

FIG. 6 shows one example of an AGC gain/amplitude table;

FIG. 7A shows one example of a map used to specify a magnification change rate ZR;

FIG. 7B shows one example of an allowable focus moving amount table used to specify an allowable amplitude Am;

FIG. 8 shows one example of an amplitude ratio/sampling number table; and

DESCRIPTION OF THE PREFERRED EMBODIMENTS

Figure 1:
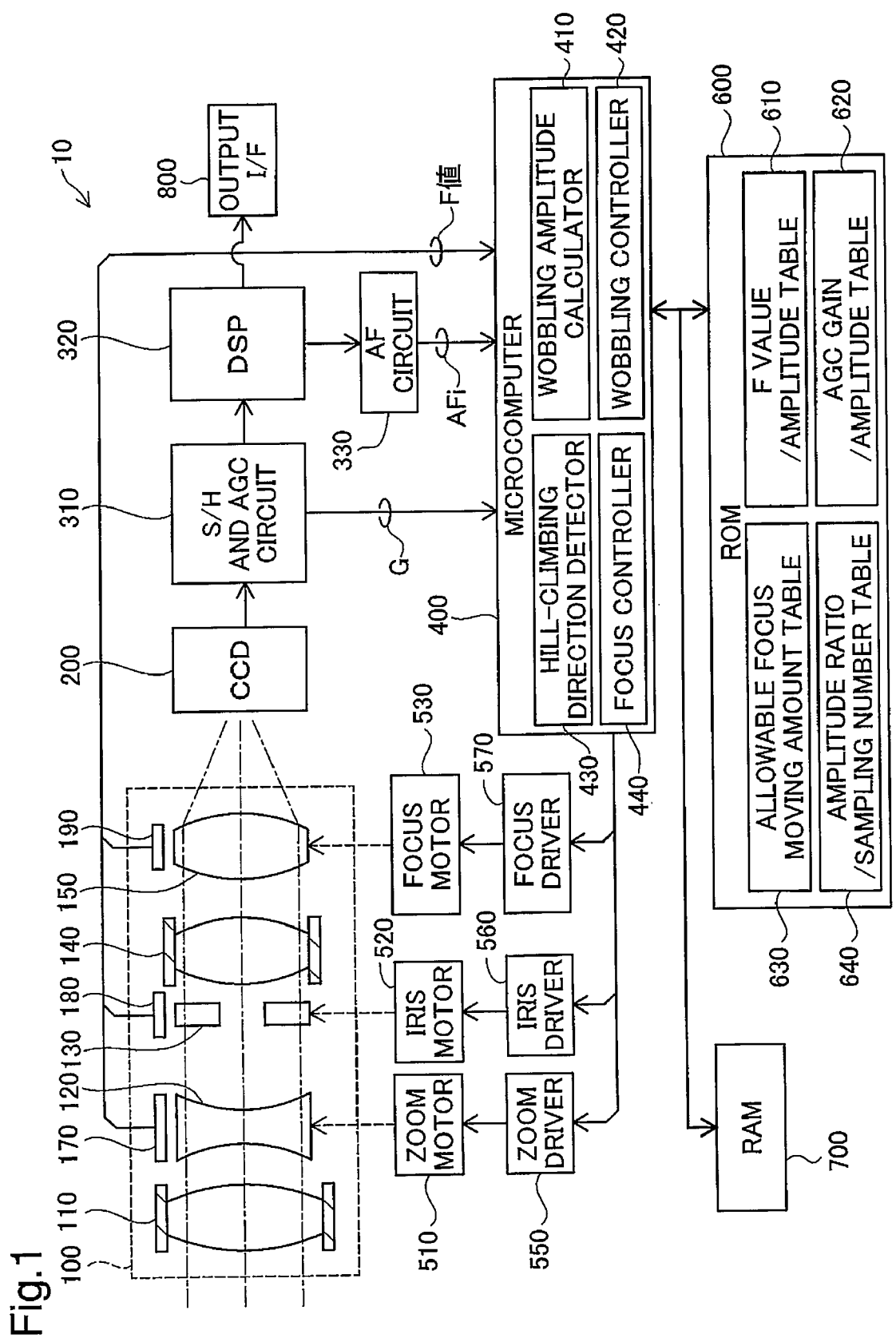
FIG. 1 is a block diagram illustrating the schematic structure of a digital video camera in one embodiment of the invention.

One mode of carrying out the invention is described below in the following sequence with reference to the accompanied drawings:

(1) General Structure of Digital Video Camera
(2) Autofocusing Process
(3) Wobbling Amplitude Computation Process
(4) Wobbling Amplitude Review Process
(5) Other Aspects (1) General Structure of Digital Video Camera FIG. 1 is a block diagram illustrating the schematic structure of a digital video camera 10 in one embodiment of the invention. The digital video camera 10 is a fixed security camera having hill-climbing autofocus functions. As illustrated in FIG. 1, the digital video camera 10 includes a lens block 100, a CCD 200, a sample hold (S/H) and AGC (automatic gain control) circuit 310, a DSP (digital signal processor) 320, an AF circuit 330, a microcomputer 400, lens and iris drive motors 510 to 530, lens and iris drivers 550 to 570, a ROM 600, a RAM 700, and an output interface 800.

The lens block 100 includes a first stationary lens 110, a movable variator lens 120 having a variable magnification function, an iris 130 having a function of regulating the quantity of light passing through the lens, a second stationary lens 140, a movable compensator lens 150 having both a focusing function and a function of compensating a focus position in the course of changing the magnification, position detectors 170 and 190 respectively detecting the position of the variator lens 120 and the position of the compensator lens 150, and an aperture setting detector 180 detecting an aperture setting of the iris 130. This series of lenses adjusts the magnitude, the light quantity, and the focus of an entered optical image in a certain depth of field and focuses the adjusted optical image on the plane of the CCD 200. Each of these lenses is assumed to be constructed as a single lens component in the description of this embodiment for the convenience of explanation, but may have multiple lens components.

The CCD 200 is an imaging element of converting the focused optical image into an electric signal. Another imaging element, such as a CMOS, may replace the CCD used as the imaging element in this embodiment.

The sample hold and AGC circuit 310 removes switching noise from the output of the CCD 200 to extract a signal component, while controlling the gain to keep a constant output signal level. The DSP 320 is a specific processor that converts the analog signal output from the sample hold and AGC circuit 310 into a digital signal to generate a luminance signal and a chromatic signal and performs a required series of processing including gamma correction, aperture correction, and white balance adjustment. The AF circuit 330 includes a high pass filter, an absolute value circuit, a gate circuit, and a wave detector. In this embodiment, the high pass filter is designed to enable selection of the shielding frequency between two options, 1 MHz and several tens kHz. In the AF circuit 330, the high pass filter extracts a high frequency component of a luminance signal from a video signal output from the DSP 320, and the absolute value circuit converts the extracted high frequency component into an absolute value. The gate circuit subsequently extracts only signal components present in a preset distance measurement range. The wave detector detects a signal peak of the extracted signal components as an AF evaluation value.

The zoom motor 510 and the focus motor 530 are stepping motors to respectively shift the position of the variator lens 120 and the position of the compensator lens 150 for adjusting the magnification and for focusing. The iris motor 520 is a galvanometer to open and close the iris 130 for regulating the quantity of light.

According to a control program stored in the ROM 600, the microcomputer 400 activates the focus motor 530 via the focus driver 570 to shift the position of the compensator lens 150 and accomplish the autofocusing control, in order to maximize the AF evaluation value obtained by the AF circuit 330. The microcomputer 400 also controls the operations of the whole digital video camera 10. The microcomputer 400 extends and executes a control program stored in the ROM 600 to function as a wobbling amplitude calculator 410, a wobbling controller 420, a hill-climbing direction detector 430, and a focus controller 440.

The ROM 600 stores the control programs that are required for the operations of the digital video camera 10 and are executed by the microcomputer 400, as well as an F value/amplitude table 610, an AGC gain/amplitude table 620, an allowable focus moving amount table 630, and an amplitude ratio/sampling number table 640 used in an autofocusing process described later.

The RAM 700 has storage areas including a work area in which the microcomputer 400 executes the control programs. These storage areas may be set in an internal register of the microcomputer 400.

The output interface 800 functions to output video data captured by the digital video camera 10. For example, connection of a monitor (not shown) to the output interface 800 enables the video data captured by the digital video camera 10 to be displayed on the monitor screen.

(2) Autofocusing Process

Figure 2:
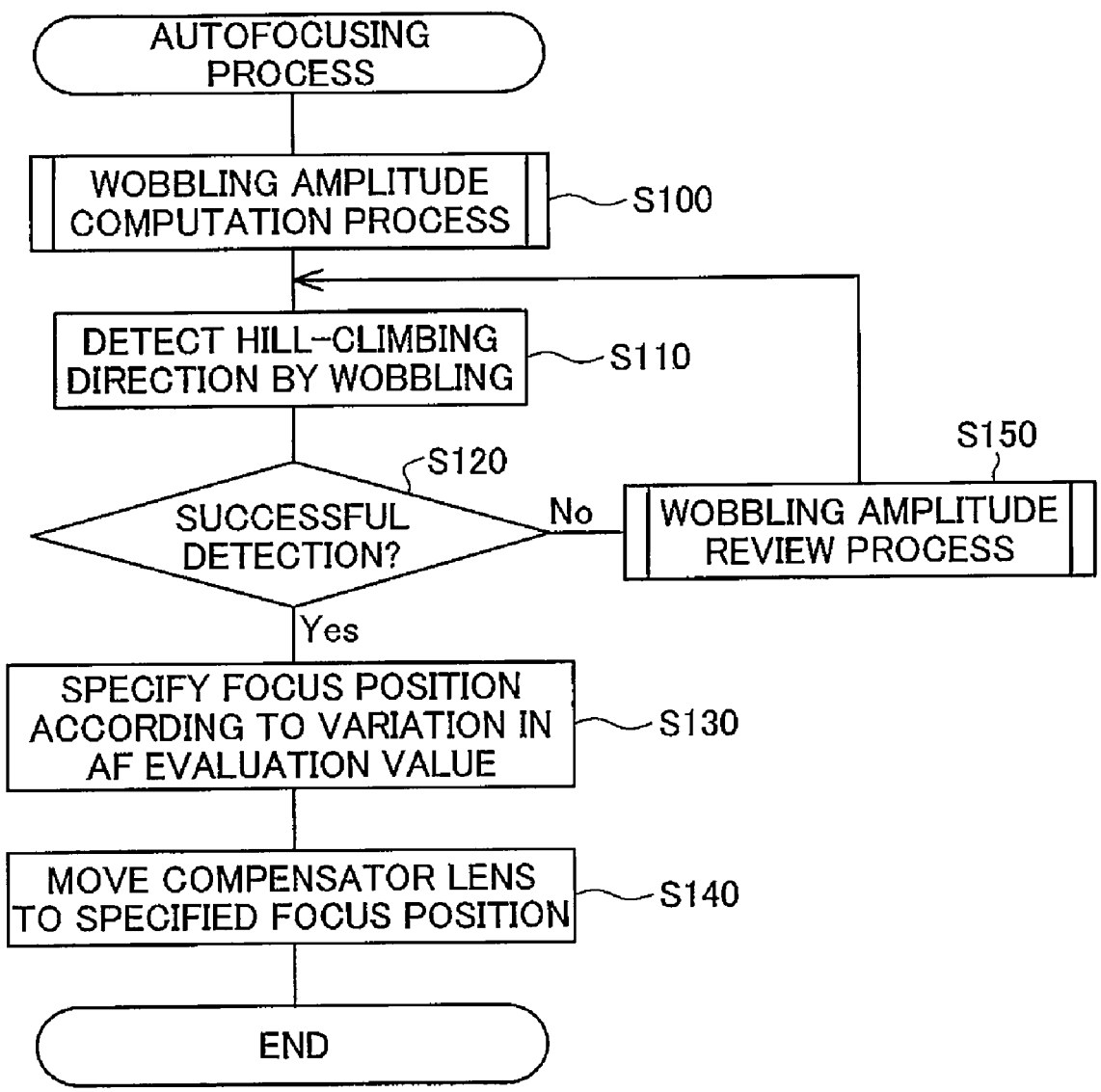
FIG. 2 is a flowchart showing an autofocusing process executed in the digital video camera.

FIG. 2 is a flowchart showing an autofocusing process executed in the digital video camera 10. The autofocusing process shifts the position of the compensator lens 150 to automatically adjust the focus position in capture of an image with the digital video camera 10.

On the start of the autofocusing process, as the function of the wobbling amplitude calculator 410, the microcomputer 400 performs a wobbling amplitude computation process to specify a wobbling amplitude and a sampling number SR of AF evaluation values (step S100). The wobbling technique minutely oscillates the compensator lens 150 at a fixed wobbling amplitude along an optical axis to detect the AF evaluation value at each shift position. The increasing direction of the AF evaluation value is identified as the focusing direction of the compensator lens 150. The wobbling amplitude represents the amplitude of the minute oscillation of the compensator lens 150 for wobbling. An excess increase of the wobbling amplitude may shake or adversely affect a captured image. The adequate wobbling amplitude and the adequate sampling number SR of AF evaluation values for ensuring the sufficient detection performance of the hill-climbing direction are accordingly determined at step S100. The details of the wobbling amplitude computation process executed at step S100 will be described later with reference to the flowchart of FIG. 4. In this embodiment, the unit of the wobbling amplitude is 1 step as a moving distance corresponding to 1 pulse of the focus motor 530.

Figure 3A:
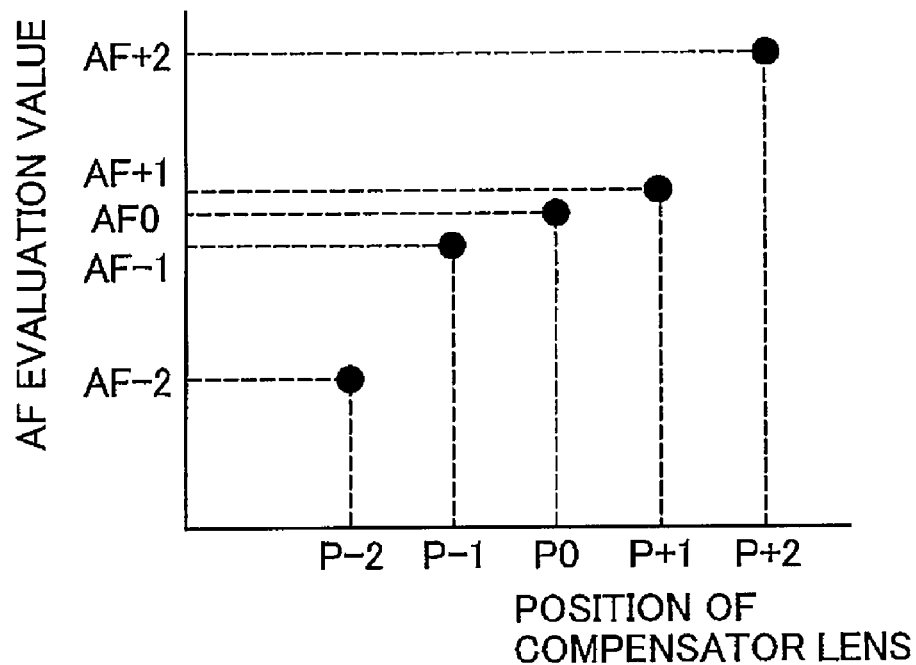
FIGS. 3A and 3B show detection of the hill-climbing direction.

The microcomputer 400 performs wobbling at the wobbling amplitude specified at step S100 as the function of the wobbling controller 420, and detects the hill-climbing direction by the wobbling as the function of the hill-climbing direction detector 430 (step S110). Detection of the hill-climbing direction is described with reference to FIG. 3A. In the illustrated example, it is assumed that the wobbling amplitude and the sampling number SR of AF evaluation values are respectively specified as 2 steps and 1 time at step S100. The microcomputer 400 drives the focus motor 530 via the focus driver 570 to move the compensator lens 150 back and forth about a current position P0. The compensator lens 150 reciprocates once between a position (P+2) rightward (in the drawing) by the specified wobbling amplitude of 2 steps and a position (P−2) leftward (in the drawing) by the specified wobbling amplitude of 2 steps and returns to the initial position P0. The AF evaluation value is detected once at each step position. When the AF evaluation values (AF−2) to (AF+2) detected at the respective step positions have an increasing tendency as shown in FIG. 3A, the microcomputer 400 identifies the rightward (in the drawing) as the hill-climbing direction or the direction having the focus position of the compensator lens 150. The rightward (in the drawing) represents a farther direction FAR and the leftward (in the drawing) represents a closer direction NEAR.

In the case of specification of the sampling number SR of AF evaluation values to multiple times, for example, 3 times, the procedure of the embodiment reciprocates the compensator lens 150 three times between the rightward position (P+2) and the leftward position (P−2) and detects the AF evaluation value at each step position once in every reciprocating motion, that is, three times as a total. This procedure is, however, not restrictive, but one modified procedure may detect the AF evaluation value three times at each step position during one reciprocating motion.

For the better detection performance of the hill-climbing direction, the procedure of wobbling in this embodiment moves back and forth the compensator lens 150 along the optical axis. This is, however, not restrictive, but one modified procedure of wobbling may move the compensator lens 150 only in one predetermined direction, that is, either the forward direction or the backward direction. In the illustrated example described above, the procedure of wobbling in the embodiment reciprocates the compensator lens 150 about the current position P0 once between the position (P+2) rightward (in the drawing) by the specified wobbling amplitude of 2 steps and the position (P−2) leftward (in the drawing) by the specified wobbling amplitude of 2 steps and then returns the compensator lens 150 to the initial position P0. The modified procedure of wobbling may move the compensator lens 150 from the current position P0 to the position (P+2) rightward (in the drawing) by the specified wobbling amplitude of 2 steps and then return the compensator lens 150 to the initial position P0.

The microcomputer 400 subsequently determines whether detection of the hill-climbing direction at step S110 is successful or failed (step S120). There is a possibility of failed detection of the hill-climbing direction when the variation of the AF evaluation value detected at the specified wobbling amplitude is extremely small or irregular by the influence of noise. Upon failed detection of the hill-climbing direction (step S120: no), the microcomputer 400 performs a wobbling amplitude review process to update the wobbling amplitude and the sampling number SR of AF evaluation values for successful detection of the hill-climbing direction (step S150) and returns the processing flow to step S110. The details of the wobbling amplitude review process executed at step S150 will be described later with reference to the flowchart of FIG. 9.

Figure 3B:
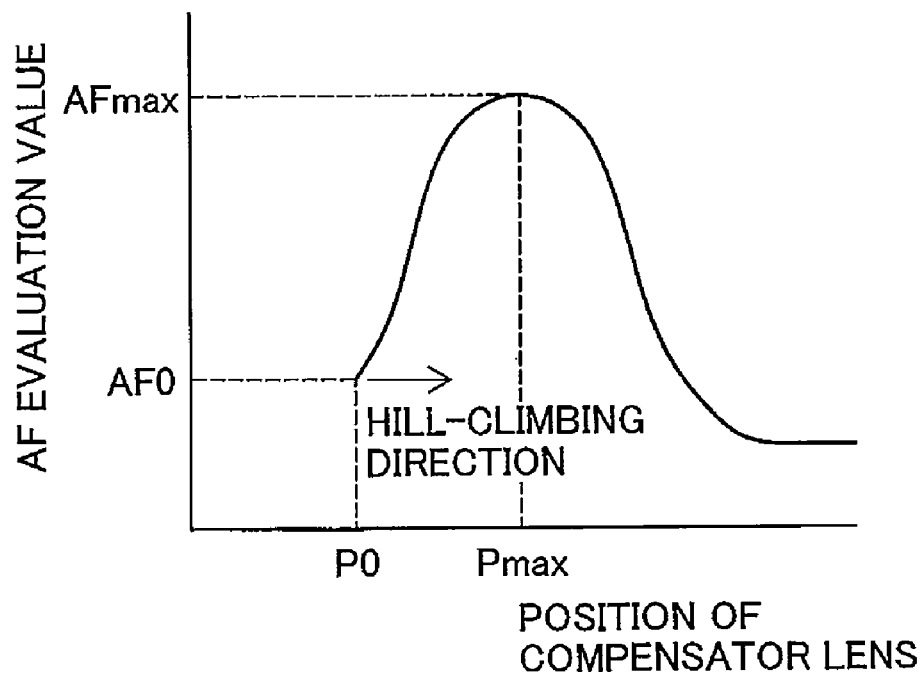

Upon successful detection of the hill-climbing direction (step S120: yes), on the other hand, as shown in FIG. 3B, the microcomputer 400 as the function of the focus controller 440 drives the focus motor 530 via the focus driver 570 to move the compensator lens 150 from the current position P0 in the identified hill-climbing direction, detects an AF evaluation value AFi at each step position, and specifies a position Pmax corresponding to a peak value AFmax of the detected AF evaluation value AFi (step S130). The specified position Pmax represents the focus position of the compensator lens 150 in the depth of the field. The microcomputer 400 then moves the compensator lens 150 to the specified position Pmax (step S140) and terminates the autofocusing process.

(3) Wobbling Amplitude Computation Process

Figure 4:
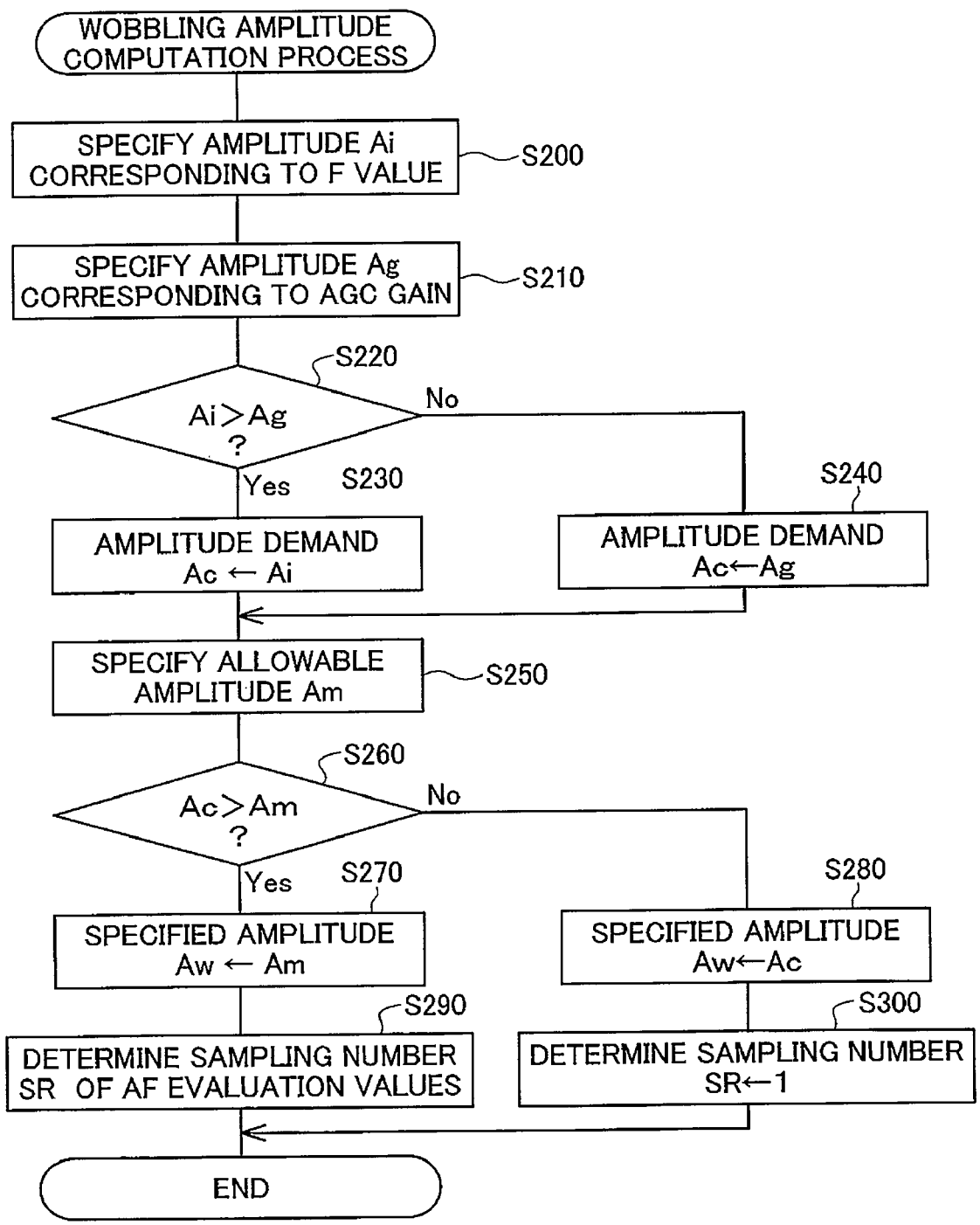
FIG. 4 is a flowchart showing the details of a wobbling amplitude computation process executed at step S100 in the autofocusing process of FIG. 2.

The flowchart of FIG. 4 shows the details of the wobbling amplitude computation process executed at step S100 in the autofocusing process of FIG. 2. On the start of the wobbling amplitude computation process, the microcomputer 400 first controls the aperture detector 180 to obtain an F value and refers to the F value/amplitude table 610 to specify a wobbling amplitude Ai corresponding to the F value (step S200).

One example of the F value/amplitude table 610 is shown in FIG. 5. The F value/amplitude table 610 defines values of the wobbling amplitude Ai in correlation to the F value. In general, the greater F value leads to the greater depth of the field and the weaker edge of the captured image and thereby decreases the variation in AF evaluation value detected at the fixed wobbling amplitude. This makes it difficult to accurately detect the hill-climbing direction according to the AF evaluation value detected at the fixed wobbling amplitude. The F value/amplitude table 610 is thus designed to increase the wobbling amplitude with an increase in F value and thereby encourages the accurate detection of the hill-climbing direction. The wobbling amplitude Ai specified here represents the wobbling amplitude required for ensuring the sufficient detection performance of the hill-climbing direction based on the F value.

The microcomputer 400 subsequently controls the sample hold and AGC circuit 310 to detect an AGC gain G and refers to the AGC gain/amplitude table 620 to specify a wobbling amplitude Ag corresponding to the AGC gain G (step S210).

One example of the AGC gain/amplitude table 620 is shown in FIG. 6. The AGC gain/amplitude table 620 defines values of the wobbling amplitude Ag in correlation to the AGC gain G. In general, the higher AGC gain leads to the lower S/N ratio and thereby increases the variation in AF evaluation value detected at the fixed wobbling amplitude. This lowers the reliability of detection of the AF evaluation value and makes it difficult to accurately detect the hill-climbing direction according to the AF evaluation value detected at the fixed wobbling amplitude. The AGC gain/amplitude table 620 is thus designed to increase the wobbling amplitude with an increase in AGC gain G and thereby encourages the accurate detection of the hill-climbing direction. The wobbling amplitude Ag specified here represents the wobbling amplitude required for ensuring the sufficient detection performance of the hill-climbing direction based on the AGC gain.

The microcomputer 400 then compares the wobbling amplitude Ai with the wobbling amplitude Ag and determines whether the wobbling amplitude Ai is greater than the wobbling amplitude Ag (step S220). When the wobbling amplitude Ai is greater than the wobbling amplitude Ag (step S220: yes), the wobbling amplitude Ai is set to an amplitude demand Ac that is required for ensuring the sufficient detection performance of the hill-climbing direction based on the F value and the AGC gain (step S230). When the wobbling amplitude Ai is not greater than the wobbling amplitude Ag (step S220: no), on the other hand, the wobbling amplitude Ag is set to the amplitude demand Ac (step S240).

After setting the amplitude demand Ac either at step S230 or at step S240, the microcomputer 400 refers to the allowable focus moving amount table 630 to specify an allowable amplitude Am (step S250). The specification of the allowable amplitude Am is described with reference to FIGS. 7A and 7B. The compensator lens 150 compensates the focus position in the course of changing the magnification as mentioned previously. The position shift of the compensate lens 150 causes a slight difference in magnification change. The magnification change is defined by a magnification change rate ZR. The magnification change rate ZR represents a ratio of a change amount of magnification relative to a moving amount of the compensator lens 150 in unit steps to a magnification at a reference position and is obtained by Equation (1) given below:

$$ZR\ (\%) = \text{Change Amount of Magnification} \div \text{Magnification at Reference Position} \quad (1)$$

The magnification change rate ZR has positive values when the compensator lens 150 moves from the FAR direction to the NEAR direction.

FIG. 7A shows one example of a map used for specifying the magnification change rate ZR. The magnification change rate ZR is specified corresponding to a zoom position ZP and an object distance OD and depends upon the camera characteristics. In this illustrated example, the maximum magnification change is observed at the zoom position ZP set to the Tele end and the object distance OD set to the infinite (□). The zoom positions ZP and the object distances OD in FIG. 7A are given as typical settings and are not restrictive in any purpose. Any suitable combinations other than those shown in FIG. 7A are available according to the camera characteristics.

As shown in FIG. 7A, the position shift of the compensator lens 150 changes the magnification. In the compensator lens 150 having the large wobbling amplitude, the magnification change may cause a shake of the captured image in wobbling. In the illustrated example of FIG. 7A, there is the highest potential for such an image shake in the combination of the Tele-end zoom position ZP and the infinite (□) object distance OD giving the maximum magnification change rate ZR. The wobbling amplitude is thus desirable to be in an unobservable range of the shake of the captured image with naked eyes. From this point of view, the wobbling amplitude ensuring the unobservable level of the image shake is specified as the allowable amplitude Am.

FIG. 7B shows one example of the allowable focus moving amount table 630 used for specification of the allowable amplitude Am. The allowable focus moving amount table 630 defines values of the allowable amplitude Am in correlation to the zoom position ZP and the object distance OD. This correlation is determined empirically based on the camera characteristics or based on the magnification change rate ZR shown in FIG. 7A. In the illustrated example, the allowable amplitude Am ensuring no observable image shake in wobbling is equal to 4 in the combination of the zoom position ZP set to '□1' (Wide end) and the object distance OD set to '5 m'. The allowable amplitude Am in the combination of the zoom position ZP and the object distance OD other than the given combinations in FIG. 7B is determinable by interpolation from the values of the allowable amplitude Am corresponding to the given combinations. Any suitable interpolation technique, for example, linear interpolation, may be adopted for this purpose. The combinations of the zoom position ZP and the object distance OD and their number shown in FIG. 7B are only illustrative and not restrictive in any sense. The combinations and their number may be set freely according to the change characteristic of the magnification change rate ZR and the required accuracy.

After specification of the allowable amplitude Am, the microcomputer 400 compares the amplitude demand Ac and the allowable amplitude Am and determines whether the amplitude demand Ac is greater than the allowable amplitude Am (step S260). When the amplitude demand Ac is greater than the allowable amplitude Am (step S260: yes), the allowable amplitude Am is set to the wobbling amplitude (step S270). The eventually set wobbling amplitude is hereafter called a specified amplitude Aw. If the amplitude demand Ac that is required for ensuring the sufficient detection performance of the hill-climbing direction but is greater than the allowable amplitude Am is set to the specified amplitude Aw, there is an observable shake of the captured image. Namely the setting at step S270 restricts the wobbling amplitude to a maximum allowable range that ensures no observable image shake.

After setting the allowable amplitude Am to the specified amplitude Aw, the microcomputer 400 refers to the amplitude ratio/sampling number table 640 to determine the sampling number SR of AF evaluation values to be detected at the respective step positions in wobbling (step S290). In order to prevent a potential image shake, the allowable amplitude Am that is smaller than the amplitude demand Ac required for ensuring the sufficient detection performance of the hill-climbing direction is set to the specified amplitude Aw at step S270. The sampling number SR of AF evaluation values is thus increased at step S290 to attain the sufficient detection performance of the hill-climbing direction. A standard sampling number is set equal to 1 time in this embodiment.

One example of the amplitude ratio/sampling number table 640 is shown in FIG. 8. The amplitude ratio/sampling number table 640 defines values of the sampling number SR of AF evaluation values to be detected at the respective step positions in wobbling in correlation to an amplitude ratio AR. The amplitude ratio AR represents the ratio of the amplitude demand Ac to the allowable amplitude Am and is obtained by Equation (2) given below:

$$AR = Ac/Am \quad (2)$$

The amplitude ratio/sampling number table 640 is designed to increase the sampling number SR of AF evaluation values from the standard sampling number '1' with an increase in amplitude ratio AR. For example, the sampling number SR of AF evaluation values is equal to 2 times corresponding to the amplitude ratio AR of 2 and is equal to 3 times corresponding to the amplitude ratio AR of 3. Namely the sampling number SR of AF evaluation values is increased according to the degree of insufficiency of the allowable amplitude Am set to the specified amplitude Aw relative to the amplitude demand Ac required for ensuring the sufficient detection performance of the hill-climbing direction. Such setting efficiently enhances the detection accuracy of the hill-climbing direction. The procedure of this embodiment determines the sampling number SR of AF evaluation values corresponding to the amplitude ratio AR. This is, however, not essential but may be modified. For example, the sampling number SR of AF evaluation values may be determined corresponding to a difference between the amplitude demand Ac and the allowable amplitude Am.

When the amplitude demand Ac is not greater than the allowable amplitude Am (step S260: no), on the other hand, the microcomputer 400 sets the amplitude demand Ac to the wobbling amplitude or the specified amplitude Aw (step S280).

The microcomputer 400 then sets the standard sampling number '1' to the sampling number SR of AF evaluation values (step S300). In this case, since the amplitude demand Ac is set to the specified amplitude Aw, the standard sampling number ensures the sufficient detection performance of the hill-climbing direction. Although the standard sampling number is set to 1 time in this embodiment, the standard sampling number is not limited to 1 time but may be increased to multiple times, for example, 3 times, with a view to enhancing the detection accuracy of the hill-climbing direction. In this case, the standard sampling number '3' is set to the sampling number SR of AF evaluation values at step S300.

After setting of the specified amplitude Aw and determination of the sampling number SR of AF evaluation values, the microcomputer 400 terminates the series of wobbling amplitude computation process shown in FIG. 4 and returns to the autofocusing process of FIG. 2.

The wobbling amplitude computation process of this embodiment refers to the relevant tables stored in the ROM 600 to specify the amplitude Ai, the amplitude Ag, the allowable amplitude Am, and the sampling number SR of AF evaluation values at steps S200, S210, S250, and S290. The amplitude Ai, the amplitude Ag, the allowable amplitude Am, and the sampling number SR of AF evaluation values may alternatively be determined by preset relevant functions.

(4) Wobbling Amplitude Review Process

Figure 9:
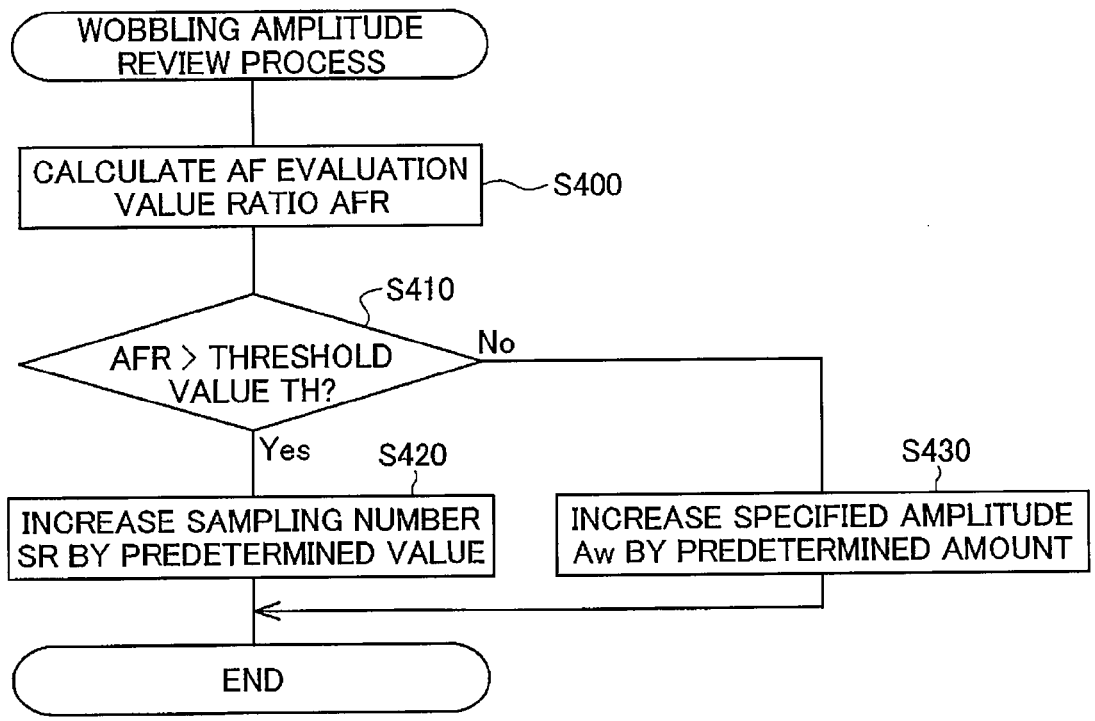
FIG. 9 is a flowchart showing the details of a wobbling amplitude review process executed at step S150 in the autofocusing process of FIG. 2.

The flowchart of FIG. 9 shows the details of the wobbling amplitude review process executed at step S150 in the autofocusing process of FIG. 2. On the start of the wobbling amplitude review process, the microcomputer 400 first calculates an AF evaluation value ratio AFR (step S400). The AF evaluation value ratio AFR represents the ratio of an AF evaluation value AFw detected in the wobbling at step S110 to an AF evaluation value AFf detected in the control of the compensator lens 150 to the focus position and is obtained by Equation (3) given below:

$$AFR = AFw/AFf \quad (3)$$

When there are multiple AF evaluation values detected in the wobbling, an average value of the detected multiple AF evaluation values is used as the AF evaluation value AFw in this embodiment. This is, however, not restrictive, but any other suitable value, for example, a minimum value, a maximum value, or a last value, may be used as the AF evaluation value AFw.

The microcomputer 400 subsequently compares the calculated AF evaluation value ratio AFR with a preset threshold value TH and determines whether the AF evaluation value ratio AFR is greater than the preset threshold value TH (step S410). When the AF evaluation value ratio AFR is greater than the preset threshold value TH (step S420: yes), there is no significant difference between the AF evaluation value detected in the wobbling and the AF evaluation value detected at the focus position of the compensator lens 150. Namely it is expected that the position of the compensator lens 150 in the wobbling is close to the focus position. In this case, a further increase of the wobbling amplitude may cause an image shake by the magnification change and worsen the resulting image quality. The microcomputer 400 thus increases the sampling number SR of AF evaluation values by a predetermined value, while keeping the specified amplitude Aw set at step S100 in the autofocusing process unchanged (step S420).

In the case of setting the sampling number SR of AF evaluation values to multiple times, a most frequently-detected increasing direction (hill-climbing direction) of the AF evaluation values is eventually specified as the hill-climbing direction. For example, the specified hill-climbing (HC) direction may be related to the sampling number SR and the detected hill-climbing (HC) directions as follows:

SR Detected HC Directions Specified HC Direction (1) 2 Not Detected/NEAR NEAR (2) 2 FAR/NEAR Not Determined (3) 3 FAR/NEAR/FAR FAR The eventual specification of the hill-climbing direction is, however, not restricted to this method, but any other suitable method may be adopted for the same purpose. In one example, a hill-climbing direction detected corresponding to a largest variation of the AF evaluation value may be specified as the hill-climbing direction. In another example, a hill-climbing direction detected a predetermined number of times may be specified as the hill-climbing direction.

When the AF evaluation value ratio AFR is not greater than the preset threshold value TH (step S420: no), on the other hand, there is a significant difference between the AF evaluation value detected in the wobbling and the AF evaluation value detected at the focus position of the compensator lens 150. Namely it is expected that the position of the compensator lens 150 in the wobbling is far from the focus position and is a defocus position. In this case, a further increase of the wobbling amplitude is supposed to cause no observable image shake by the magnification change and have no adverse effect on the resulting image quality. The microcomputer 400 thus increases the specified amplitude Aw by a predetermined amount, while keeping the sampling number SR of AF evaluation values determined at step S100 in the autofocusing process unchanged (step S430).

The microcomputer 400 then terminates the series of wobbling amplitude review process shown in FIG. 9 and returns to the autofocusing process of FIG. 2. The procedure of the embodiment uses the AF evaluation value ratio AFR as the criterion of determining the focusing degree in the wobbling. This is, however, not restrictive, but any other suitable value may be used as a criterion of determining a deviation of the current AF evaluation value from the AF evaluation value detected at the focus position. For example, a difference between the AF evaluation value AFw and the AF evaluation value AFf may be used in place of the AF evaluation value ratio AFR.

In the digital video camera 10 of the embodiment described above, the wobbling amplitude is determined in the specific range where the image shake by the magnification change with a position shift of the compensator lens 150 is an unobservable level with naked eyes. The sampling number SR of AF evaluation values in the wobbling is increased according to the requirement. This arrangement ensures the sufficient detection performance of the hill-climbing direction for autofocusing control, while effectively preventing an image shake by the magnification change.

In the case of failed detection of the hill-climbing direction, the digital video camera 10 of the embodiment determines the current focusing degree based on the AF evaluation value detected in the wobbling and the AF evaluation value detected at the focus position. Based on this determination result, the wobbling amplitude and the sampling number SR of AF evaluation values in the wobbling are updated in the specific range of having no adverse effect on the resulting image quality. This arrangement thus efficiently ensures the sufficient detection performance of the hill-climbing direction for autofocusing control, while effectively preventing an image shake by the magnification change.

(5) Other Aspects

The imaging device constructed as the digital video camera in the above embodiment may have any of the following applications. In one preferable application of the imaging device, the setting module sets the variation range to narrow the variation range with an increase in magnification change.

The imaging device of this application narrows the variation range of the state of the optical system with an increase of the magnification change. This arrangement restricts the magnification change of the optical image due to the change of the state of the optical system, thus effectively preventing deterioration of the resulting image quality.

In another preferable application of the imaging device, the optical system has: a lens unit that shifts position of at least one lens among multiple lenses included in the optical system to adjust a focal distance; and a moving actuator that moves the at leans one lens. The state of the optical system is defined by a position of the at least one lens moved by the moving actuator.

In the imaging device of this application, the optical system has multiple lenses, and the focal distance is adjusted by moving the lens. The advantage of preventing deterioration of the resulting image quality by the magnification change of the optical image with the position shift of the lens for detection of the focusing direction is attained in the imaging device having this structure.

In one preferable embodiment of the imaging device, the setting module sets the variation range, based on at least one of a first parameter relating to the optical system and affecting the intensity of the specific signal and a second parameter affecting an intensity of a noise signal included in the specific signal, in addition to the information on the magnification change.

In the imaging device of this embodiment, the variation range of changing the state of the optical system for detection of the focusing direction is set, based on at least one of the parameters affecting the intensity of the specific signal and the intensity of the noise signal included in the specific signal, in addition to the information on the magnification change of the optical image due to the change of the state of the optical system. This arrangement enables the efficient detection of the focusing direction, while preventing deterioration of the resulting image quality caused by the magnification change of the optical image with a position shift of a lens.

In the imaging device of this embodiment, the first parameter may be an aperture of the optical system. The variation range of changing the state of the optical system for detection of the focusing direction is set, based on the aperture having a significant influence on the intensity of the specific signal, as well as the information on the magnification change. This arrangement thus ensures the efficient detection of the focusing direction.

In the imaging device of this embodiment, the second parameter may be the gain. The variation range of changing the state of the optical system for detection of the focusing direction is set, based on the gain having a significant influence on the intensity of the noise signal included in the specific signal, as well as the information on the magnification change. This arrangement thus ensures the efficient detection of the focusing direction.

In the imaging device of this embodiment, it is preferable that the setting module sets the specified number of times, in addition to the variation range, based on the information on the magnification change of the optical image and at least one of the first parameter and the second parameter.

In the imaging device of this preferable application, the setting module adjusts not only the variation range of the state of the optical system for detection of the focusing direction but the frequency of detecting the variation in intensity of the specific signal. This arrangement enhances the detection performance of the focusing direction, while preventing deterioration of the resulting image quality caused by the magnification change of the optical image with the change of the state of the optical system.

In one preferable application of the imaging device of the above embodiment, when the focusing direction detector fails to detect the focusing direction based on the detected variation in intensity of the specific signal, the setting module updates the settings either to expand the variation range or to increase the specified number of times, based on a magnitude of a difference between the intensity of the specific signal in a state of failed detection of the focusing direction and the intensity of the specific signal in the focus state of the optical system.

In the imaging device of this application, in the event of failed detection of the focusing direction by the focusing direction detector, the setting module updates the settings to expand the variation range of the state of the optical system for detection of the focusing direction or to increase the frequency of detecting the intensity of the specific signal, based on the magnitude of the difference in intensity of the specific signal. This arrangement desirably enhances the detection performance of the focusing direction.

The embodiment and its modified examples discussed above are to be considered in all aspects as illustrative and not restrictive. There may be many other modifications, changes, and alterations without departing from the scope or spirit of the main characteristics of the present invention. The above embodiment regards the digital video camera 10 that shifts the position of the compensator lens 150 to attain the autofocusing control. The technique of the invention is, however, not restricted to the digital video camera 10 of this arrangement but is also applicable to a digital video camera that moves the position of the CCD or changes the shape of the lens by application of a voltage to attain the autofocusing control. The principle of the invention may further be adopted in diversity of imaging devices, including digital video cameras for business or industrial use, portable digital video cameras for consumer use, digital video cameras mounted on cellular phones, network cameras, as well as security cameras.

What is claimed is:

1. An imaging device that converts an optical image, which is captured via an optical system having a focusing function, into a video signal by means of an imaging system, the imaging device comprising:

a high frequency component extractor that adjusts the video signal with a preset gain controlled according to an imaging condition and detects intensity of a specific signal in a certain frequency band, which includes at least a high frequency component and is generated in a focus state of the optical image captured via the optical system, from the adjusted video signal;

a setting module that sets a variation range of changing a state of the optical system, based on at least information on a magnification change of the optical image caused by a change of the state of the optical system, where the variation range is used for detection of a state changing direction of the optical system or a focusing direction for focusing the optical image;

wherein the setting module measures a rate of the magnification change that occurs with a position shift of a focus lens for focus adjustment, at least in accordance with a magnification of a zoom lens, stores the information on the relation among the variation range of changing the state of the optical system, the magnification change, and the magnification of the zoom lens, and sets the variation range based on the stored information on the relation;

a signal intensity variation detector that detects a variation in intensity of the specific signal in the set variation range a specified number of times while changing the state of the optical system in the set variation range;

a focusing direction detector that detects the focusing direction, based on the detected variation in intensity of the specific signal; and an optical system controller that detects the intensity of the specific signal while changing the state of the optical system in the detected focusing direction, specifies a certain state of the optical system giving a peak intensity of the specific signal as the focus state of the optical system, and controls the optical system to the specified focus state.

2. The imaging device in accordance with claim 1, wherein the setting module sets the variation range to narrow the variation range with an increase in magnification change.

3. The imaging device in accordance with claim 1, wherein the optical system has:

a lens unit that shifts position of at least one lens among multiple lenses included in the optical system to adjust a focal distance; and a moving actuator that moves the at leans one lens, and the state of the optical system is defined by a position of the at least one lens moved by the moving actuator.

4. The imaging device in accordance with claim 1, wherein the setting module sets the variation range, based on at least one of a first parameter relating to the optical system and affecting the intensity of the specific signal and a second narameter affecting an intensity of a noise signal included in the specific signal, in addition to the information on the magnification change.

5. The imaging device in accordance with claim 4, wherein the first parameter is an aperture of the optical system.

6. The imaging device in accordance with claim 4, wherein the second parameter is the gain.

7. The imaging device in accordance with claim 4, wherein the setting module sets the specified number of times, in addition to the variation range, based on the information on the magnification change of the optical image and at least one of the first parameter and the second parameter.

8. The imaging device in accordance with claim 7, wherein when the focusing direction detector fails to detect the focusing direction based on the detected variation in intensity of the specific signal, the setting module updates the settings either to expand the variation range or to increase the specified number of times, based on a magnitude of a difference between the intensity of the specific signal in a state of failed detection of the focusing direction and the intensity of the specific signal in the focus state of the optical system.

9. An autofocusing method for an optical system having a focusing function, the autofocusing method comprising:

setting a variation range of changing a state of the optical system, based on at least information on a magnification change of an optical image caused by a change of the state of the optical system, where the variation range is used for detection of a state changing direction of the optical system or a focusing direction for focusing the optical image captured via the optical system;

wherein the setting step includes measuring a rate of the magnification change that occurs with a position shift of a focus lens for focus adjustment, at least in accordance with a magnification of a zoom lens, storing the information on the relation among the variation range of changing the state of the optical system, the magnification change, and the magnification of the zoom lens, and setting the variation range based on the stored information on the relation;

detecting a variation in intensity of a specific signal in a certain frequency band from a video signal converted from the optical image captured via the optical system, in the set variation range a specified number of times while changing the state of the optical system in the set variation range, where the specific signal includes at least a high frequency component and is generated in a focus state of the optical image captured via the optical system;

detecting the focusing direction, based on the detected variation in intensity of the specific signal; and detecting the intensity of the specific signal with changing the state of the optical system in the detected focusing direction, specifying a certain state of the optical system giving a peak intensity of the specific signal as the focus state of the optical system, and controlling the optical system to the specified focus state.

10. An imaging device that converts an optical image, which is captured via an optical system having a focusing function, into a video signal by means of an imaging system, the imaging device comprising:

a high frequency component extractor that adjusts the video signal with a preset gain controlled according to an imaging condition and detects intensity of a specific signal in a certain frequency band, which includes at least a high frequency component and is generated in a focus state of the optical image captured via the optical system, from the adjusted video signal;

a setting module that sets a variation range of changing a state of the optical system, based on at least information on a magnification change of the optical image caused by a change of the state of the optical system, where the variation range is used for detection of a state changing direction of the optical system or a focusing direction for focusing the optical image;

a signal intensity variation detector that detects a variation in intensity of the specific signal in the set variation range a specified number of times while changing the state of the optical system in the set variation range;

a focusing direction detector that detects the focusing direction, based on the detected variation in intensity of the specific signal;

an optical system controller that detects the intensity of the specific signal while changing the state of the optical system in the detected focusing direction, specifies a certain state of the optical system giving a peak intensity of the specific signal as the focus state of the optical system, and controls the optical system to the specified focus state; and wherein when the focusing direction detector fails to detect the focusing direction based on the detected variation in intensity of the specific signal, the setting module updates the settings to expand the variation range, based on a magnitude of a difference between the intensity of the specific signal in a state of failed detection of the focusing direction and the intensity of the specific signal in the focus state of the optical system.

11. The imaging device in accordance with claim 10, wherein the setting module sets the variation range, based on at least one of a first parameter relating to the optical system and affecting the intensity of the specific signal and a second parameter affecting an intensity of a noise signal included in the specific signal, in addition to the information on the magnification change.

12. The imaging device in accordance with claim 11, wherein the setting module sets the specified number of times, in addition to the variation range, based on the information on the magnification change of the optical image and at least one of the first parameter and the second parameter.

13. An imaging device that converts an optical image, which is captured via an optical system having a focusing function, into a video signal by means of an imaging system, the imaging device comprising:

a high frequency component extractor that adjusts the video signal with a preset gain controlled according to an imaging condition and detects intensity of a specific signal in a certain frequency band, which includes at least a high frequency component and is generated in a focus state of the optical image captured via the optical system, from the adjusted video signal;

a setting module that sets a variation range of changing a state of the optical system, based on at least information on a magnification change of the optical image caused by a change of the state of the optical system, where the variation range is used for detection of a state changing direction of the optical system or a focusing direction for focusing the optical image;

a signal intensity variation detector that detects a variation in intensity of the specific signal in the set variation range a specified number of times while changing the state of the optical system in the set variation range;

a focusing direction detector that detects the focusing direction, based on the detected variation in intensity of the specific signal; and an optical system controller that detects the intensity of the specific signal while changing the state of the optical system in the detected focusing direction, specifies a certain state of the optical system giving a peak intensity of the specific signal as the focus state of the optical system, and controls the optical system to the specified focus state;

wherein when the focusing direction detector fails to detect the focusing direction based on the detected variation in intensity of the specific signal, the setting module updates the settings either to expand the variation range or to increase the specified number of times, based on a magnitude of a difference between the intensity of the specific signal in a state of failed detection of the focusing direction and the intensity of the specific signal in the focus state of the optical system.

14. The imaging device in accordance with claim 13, wherein the setting module sets the variation range, based on at least one of a first parameter relating to the optical system and affecting the intensity of the specific signal and a second parameter affecting an intensity of a noise signal included in the specific signal, in addition to the information on the magnification change.

15. The imaging device in accordance with claim 14, wherein the setting module sets the specified number of times, in addition to the variation range, based on the information on the magnification change of the optical image and at least one of the first parameter and the second parameter.

* * * * *